United States Patent
Honda et al.

(10) Patent No.: US 7,691,778 B2
(45) Date of Patent: Apr. 6, 2010

(54) EXHAUST GAS PURIFICATION CATALYST

(75) Inventors: Tomohiro Honda, Hiroshima (JP);
Tomoaki Urai, Hiroshima (JP); Ryota Fujimoto, Hiroshima (JP); Seiji Miyoshi, Hiroshima (JP); Hiroshi Yamada, Hiroshima (JP); Hideharu Iwakuni, Hiroshima (JP); Koichiro Harada, Hiroshima (JP); Koji Minoshima, Hiroshima (JP); Akihide Takami, Hiroshima (JP)

(73) Assignees: Toda Kogyo Corporation (JP); Mazda Motor Corporation (JP)

( * ) Notice: Subject to any disclaimer, the term of this patent is extended or adjusted under 35 U.S.C. 154(b) by 509 days.

(21) Appl. No.: 11/591,543

(22) Filed: Nov. 2, 2006

(65) Prior Publication Data

US 2007/0117716 A1     May 24, 2007

(30) Foreign Application Priority Data

Nov. 22, 2005    (JP)    ............................. 2005-337070

(51) Int. Cl.
*B01J 23/00*    (2006.01)
*B01J 23/10*    (2006.01)

(52) U.S. Cl. ................. 502/326; 502/304; 502/328; 502/339; 502/349

(58) Field of Classification Search ............... 502/304, 502/326, 328, 339, 349
See application file for complete search history.

(56) References Cited

U.S. PATENT DOCUMENTS

| | | | | |
|---|---|---|---|---|
| 4,927,799 A | * | 5/1990 | Matsumoto et al. | 502/303 |
| 4,957,896 A | * | 9/1990 | Matsumoto et al. | 502/304 |
| 5,015,617 A | * | 5/1991 | Ohata et al. | 502/304 |
| 5,075,276 A | * | 12/1991 | Ozawa et al. | 502/304 |
| 5,260,249 A | * | 11/1993 | Shiraishi et al. | 502/304 |
| 5,318,757 A | * | 6/1994 | Abe et al. | 422/174 |
| 5,532,198 A | * | 7/1996 | Chopin et al. | 502/304 |
| 5,607,892 A | * | 3/1997 | Chopin et al. | 502/304 |
| 5,945,369 A | * | 8/1999 | Kimura et al. | 502/304 |
| 5,948,377 A | * | 9/1999 | Sung | 423/213.5 |
| 5,958,827 A | * | 9/1999 | Suda et al. | 502/304 |
| 5,986,152 A | * | 11/1999 | Muller et al. | 570/243 |
| 6,004,525 A | | 12/1999 | Tani et al. | |
| 6,150,288 A | * | 11/2000 | Suzuki et al. | 501/105 |
| 6,171,572 B1 | * | 1/2001 | Aozasa | 423/594.12 |
| 6,180,075 B1 | * | 1/2001 | Lindner et al. | 423/213.2 |

(Continued)

FOREIGN PATENT DOCUMENTS

EP    1657219    5/2006

(Continued)

OTHER PUBLICATIONS

Extended European Search Report, EP 06123917, Dated May 7, 2007.

*Primary Examiner*—Cam N Nguyen
(74) *Attorney, Agent, or Firm*—Studebaker & Brackett PC; Donald R. Studebaker (57) ABSTRACT

An exhaust gas purification catalyst comprises: an oxygen storage component constituted by a mixed oxide containing cerium and zirconium; and a catalytic metal carried on the oxygen storage component. The oxygen storage component is in the form of hollow secondary particles each formed so that primary particles of an average particle size of less than 10 nm cohere into a shell.

3 Claims, 5 Drawing Sheets

U.S. PATENT DOCUMENTS

| | | | |
|---|---|---|---|
| 6,248,688 B1 * | 6/2001 | Wu et al. | 502/302 |
| 6,306,794 B1 * | 10/2001 | Suzuki et al. | 502/304 |
| 6,335,305 B1 * | 1/2002 | Suzuki et al. | 502/325 |
| 6,413,483 B1 * | 7/2002 | Brisley et al. | 423/239.1 |
| 6,528,451 B2 * | 3/2003 | Brezny et al. | 502/304 |
| 6,569,392 B1 * | 5/2003 | Li et al. | 423/213.5 |
| 6,576,207 B1 * | 6/2003 | Mussmann et al. | 423/212 |
| 6,677,272 B2 * | 1/2004 | Beall et al. | 502/439 |
| 6,852,665 B2 * | 2/2005 | Morikawa et al. | 502/302 |
| 6,897,182 B2 * | 5/2005 | Cutler et al. | 502/302 |
| 7,223,715 B2 * | 5/2007 | Terashima et al. | 502/339 |
| 7,265,076 B2 * | 9/2007 | Taguchi et al. | 502/326 |
| 7,287,370 B2 * | 10/2007 | Rajaram et al. | 60/274 |
| 7,307,039 B2 * | 12/2007 | Iwakuni et al. | 502/304 |
| 7,323,432 B2 * | 1/2008 | Niihara et al. | 502/300 |
| 7,341,975 B2 * | 3/2008 | Iwakuni et al. | 502/326 |
| 7,547,656 B2 * | 6/2009 | Miura | 502/327 |
| 2002/0081255 A1 * | 6/2002 | Cutler et al. | 423/213.5 |
| 2002/0160912 A1 | 10/2002 | Morikawa et al. | |
| 2002/0162912 A1 * | 11/2002 | Becherucci et al. | |
| 2004/0042939 A1 * | 3/2004 | Rajaram et al. | 422/180 |
| 2004/0048741 A1 * | 3/2004 | Poulston et al. | 502/302 |
| 2004/0151645 A1 * | 8/2004 | Li | 423/213.5 |
| 2006/0019824 A1 * | 1/2006 | Miyoshi et al. | 502/304 |
| 2006/0059900 A1 * | 3/2006 | Harada et al. | 60/297 |
| 2006/0116282 A1 | 6/2006 | Honda et al. | |

FOREIGN PATENT DOCUMENTS

| | | |
|---|---|---|
| EP | 1669135 | 6/2006 |
| JP | 9-155192 | 6/1997 |
| JP | 11-019514 | 1/1999 |
| JP | 2000-203830 | 7/2000 |
| JP | 2001-347167 | 12/2001 |
| JP | 2002-001120 | 1/2002 |
| JP | 2004-016838 | 1/2004 |
| JP | 2004-275919 | 10/2004 |
| WO | WO 01/36332 | 5/2001 |

* cited by examiner

EXHAUST GAS PURIFICATION CATALYST

CROSS-REFERENCE TO RELATED APPLICATION

This application claims priority under 35 USC 119 to Japanese Patent Application No. 2005-337070 filed on Nov. 22, 2005, the entire contents of which are incorporated herein by reference.

BACKGROUND OF THE INVENTION (a) Field of the Invention

This invention relates to exhaust gas purification catalysts.

(b) Description of the Related Art

Exhaust gas purification catalysts for motor vehicles are known in which a catalytic metal is carried on an oxygen storage component to improve catalytic activity. For example, Published Japanese Patent Applications Nos. H11-19514 and H09-155192 disclose three-way catalysts in which precious metal is carried on particles that contain ceria (Ce) and zirconia (Zr) dissolved in each other and have oxygen storage capacity. In addition, Published Japanese Patent Application No. H11-19514 discloses that the oxygen storage particles have a Zr/(Ce+Zr) mol ratio of from 0.55 to 0.90 both inclusive and have an average crystallite size of 10 nm or less. Published Japanese Patent Application No. H09-155192 also discloses that the oxygen storage particles have a Zr/(Ce+Zr) mol ratio of from 0.25 to 0.75 both inclusive and have an average crystallite size of 50 nm or less.

SUMMARY OF THE INVENTION

What is important for exhaust gas purification catalysts is to highly disperse metal components, such as catalytic metals, on an oxide support to thereby increase the number of opportunities of their contact with exhaust gas components and prevent sintering of the metal components. To accomplish this, it is desirable to increase the specific surface area of the oxide support carrying the metal components thereon. Particularly, the oxygen storage component is desired to have a large specific surface area even after exposed to high-temperature exhaust gas, because this plays an important part in the extension of the A/F window (the range of the air-fuel ratio) of the catalyst acting as a three-way catalyst and in the reduction of metal components carried on the oxygen storage component (in turn, preservation of activity due to the reduction).

With the foregoing in mind, the present invention has an object of increasing the specific surface area of a Ce—Zr-based oxygen storage component having excellent oxygen storage capacity (OSC) and thermal resistance, thereby further improving catalytic activity and durability.

To attain the above object, in the present invention, primary particles of a Ce—Zr-based mixed oxide (composite oxide) constituting an oxygen storage component have an average particle size of less than 10 nm and the primary particles are used as a shell material to form hollow secondary particles.

Specifically, the present invention is directed to an exhaust gas purification catalyst comprising: an oxygen storage component constituted by a mixed oxide containing cerium and zirconium; and a catalytic metal carried on the oxygen storage component and characterized in that the oxygen storage component is in the form of hollow secondary particles in each of which primary particles of an average particle size of less than 10 nm cohere to form a shell having fine pores.

Since the oxygen storage component has minute-size primary particles each formed by cohesion of crystallites, its specific surface area is large. In addition, since secondary particles of the oxygen storage component are hollow, its specific surface area becomes larger. Therefore, the catalytic metal can be carried on the oxygen storage component with high dispersibility, which is advantageous in improving the catalytic activity (light-off performance). Further, since the primary particles of the oxygen storage component are of minute particle size, it can quickly store and release oxygen. Furthermore, compared to an oxygen storage component in the form of solid, compact secondary particles, the oxygen storage component in the present invention has a large number of primary particles exposed at the surfaces of each secondary particle (including the shell outer surface and inner surface) and exhaust gas is more likely to pass through the shell walls of the oxygen storage component. This facilitates the exhaust gas coming into contact with the catalytic metal carried on the primary particles, which is also advantageous in improving the catalytic activity (light-off performance).

Furthermore, since the oxygen storage component has minute-size primary particles but its secondary particles are hollow, it exhibits a relatively large specific surface area even after the catalyst is exposed to high-temperature exhaust gas. Therefore, the catalytic metal can be prevented from sintering, which is advantageous in ensuring high exhaust gas purification performance for a long time.

If the average particle size of the primary particles is excessively small, the size of fine pores formed between adjacent primary particles in each shell becomes excessively small, which makes it difficult for exhaust gas components to diffusively enter the fine pores. Therefore, the lower limit of the average primary particle size may be set at, but not exclusively limited to, about 3 to 4 nm, for example.

Preferably, a NOx storage component is also carried on the oxygen storage component.

Thus, the exhaust gas purification catalyst can allow the NOx storage component to store NOx in exhaust gas at lean A/F ratios and allow the catalytic metal to reduce NOx released from the NOx storage component at rich A/F ratios, which is advantageous in improving the NOx conversion performance.

At least one of the catalytic metal and the NOx storage component is preferably carried on the surface of the oxygen storage component and the insides of the fine pores.

Where the particle size of the primary particles is less than 10 nm, each secondary particle constituted by a cohesive form of primary particles has a large number of fine pores of several nanometer diameter formed therein. According to the present invention, at least one of the catalytic metal and the NOx storage component is carried substantially uniformly over the surfaces of the secondary particles and the insides of their fine pores and thereby brought into contact with exhaust gas components entering the fine pores, which is advantageous in improving the exhaust gas purification performance.

Preferable catalytic metals include platinum (Pt), rhodium (Rh) and iridium (Ir) and preferable NOx storage components used in the exhaust gas purification catalyst include alkali earth metals, such as barium (Ba), and alkali metals, such as potassium (K).

DETAILED DESCRIPTION OF THE INVENTION

An embodiment of the present invention will be described below with reference to the drawings.

An exhaust gas purification catalyst according to the present invention is particularly useful as a three-way catalyst for converting HC, CO and NOx in exhaust gas from a car engine or a NOx storage catalyst suitable for converting NOx in exhaust gas from an engine driven at lean A/F ratios at appropriate times. In actually purifying exhaust gas, the catalyst is supported by a binder on a support, such as a honeycomb support, made of an inorganic porous material, such as cordierite, and the support supporting the catalyst is placed in the exhaust passage of an engine.

A feature of the catalyst of the present invention is the use of an oxygen storage component made of a Ce—Zr-based mixed oxide and constituted by hollow particles each formed of a cohesive form of primary particles having an average particle size of less than 10 nm. Hereinafter, the catalyst is described in detail.

INVENTIVE AND COMPARATIVE EXAMPLES OF THREE-WAY CATALYST

Example 1

$CeO_2$-Rich

An oxygen storage component in the present invention was prepared by evaporative decomposition. Specifically, predetermined amounts of zirconium oxynitrate, cerium nitrate and magnesium sulphate were dissolved in water to prepare a source solution (source solution preparation). Note that magnesium sulphate is selected, from among various kinds of addition compounds, as a compound having the effect of reducing sintering of primary particles during production of the oxygen storage component in the form of hollow secondary particles and the effect of inducing the secondary particles of the oxygen storage component into hollow structures while reducing contact points between the primary particles and its amount of addition and concentration are appropriately determined.

Next, the source solution was supplied to a furnace in the form of droplets by spraying it using air as a carrier gas (ultrasonic evaporative decomposition). The temperature in the furnace was set at 1000° C. Particles sent out of the furnace were collected by a bag filter, rinsed in water and dried, thereby obtaining an oxygen storage component (a $CeO_2$-rich mixed oxide). In this example, the oxygen storage component was prepared to have a composition of $CeO_2$:$ZrO_2$=75:25 in mass ratio.

Next, the oxygen storage component, a precious metal solution (a rhodium nitrate solution) and water were put in their respective predetermined amounts in a container and stirred, thereby obtaining a suspension (suspension preparation). The suspension was heated up to 100° C. under atmospheric pressure while being stirred, thereby evaporating water (normal-pressure evaporation to dryness). The obtained evaporated product was ground into powder (grinding). The obtained powder was calcined by keeping it at 500° C. for two hours, thereby obtaining catalyst powder in which particles of a precious metal, Rh, were carried on the oxygen storage component (calcination). The amount of Rh carried on the catalyst powder was 0.125 mass %.

Next, the catalyst powder was mixed with γ-alumina, a basic Zr binder and water to obtain a slurry (slurrying). A honeycomb support made of cordierite having 400 cells per square inch (approximately 6.54 $cm^2$) and an inter-cell wall thickness of 4 mils (approximately 0.10 mm) was immersed in the slurry and then picked up and surplus slurry was removed by air blow (formation of catalytic coating). Thereafter, the catalytic coating was dried and the honeycomb support was then calcined by keeping it at 500° C. for two hours, thereby obtaining an exhaust gas purification catalyst (calcination). The amounts of oxygen storage component, γ-alumina and Rh carried per L of the honeycomb support were 103 g, 47 g and 0.13 g, respectively.

Example 2

$ZrO_2$-Rich

An exhaust gas purification catalyst was prepared in the same manner as in Example 1 except that the composition of the oxygen storage component in the form of hollow secondary particles was $CeO_2$:$ZrO_2$=25:75 in mass ratio, i.e., $ZrO_2$-rich. The average particle size of primary particles of the oxygen storage component was less than 10 nm and the catalyst composition was the same as in Example 1.

—TEM Photographs of Oxygen Storage Components—

Figure 1:
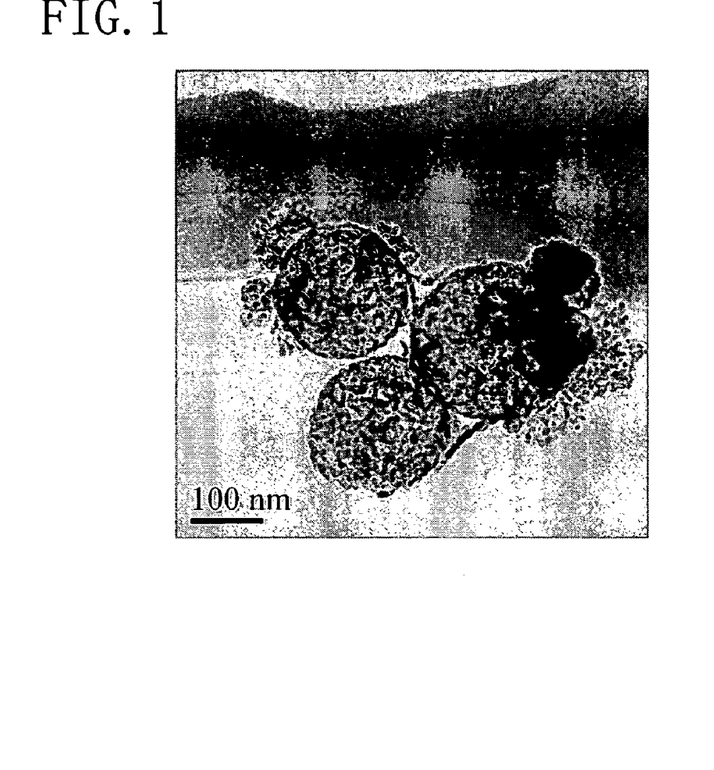
FIG. 1 is a transmission electron microscopy (TEM) photograph of a $CeO_2$-rich oxygen storage component according to an example of the present invention.
Figure 2:
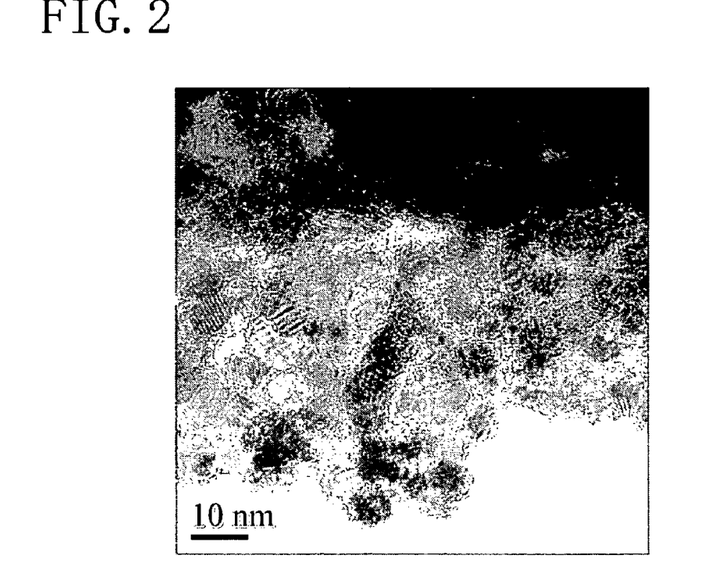
FIG. 2 is another TEM photograph with higher magnification of the same oxygen storage component.
Figure 3:
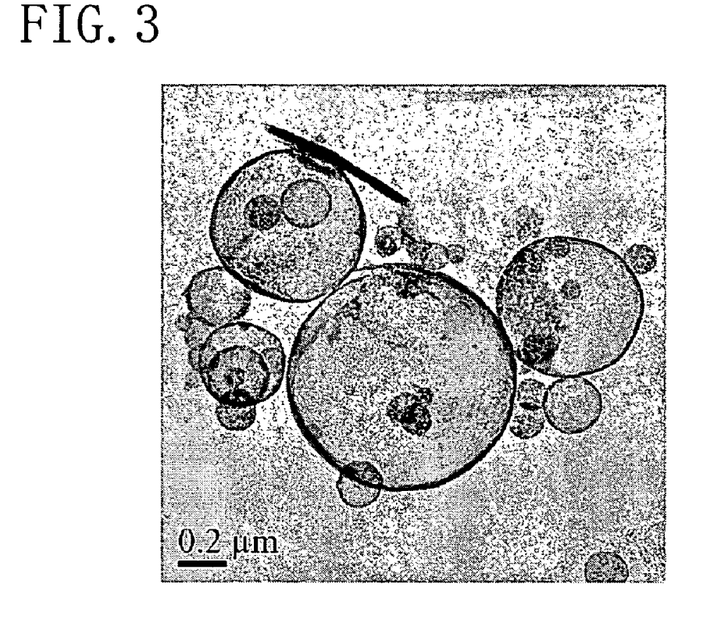
FIG. 3 is a TEM photograph of a $ZrO_2$-rich oxygen storage component according to an example of the present invention.
Figure 4:
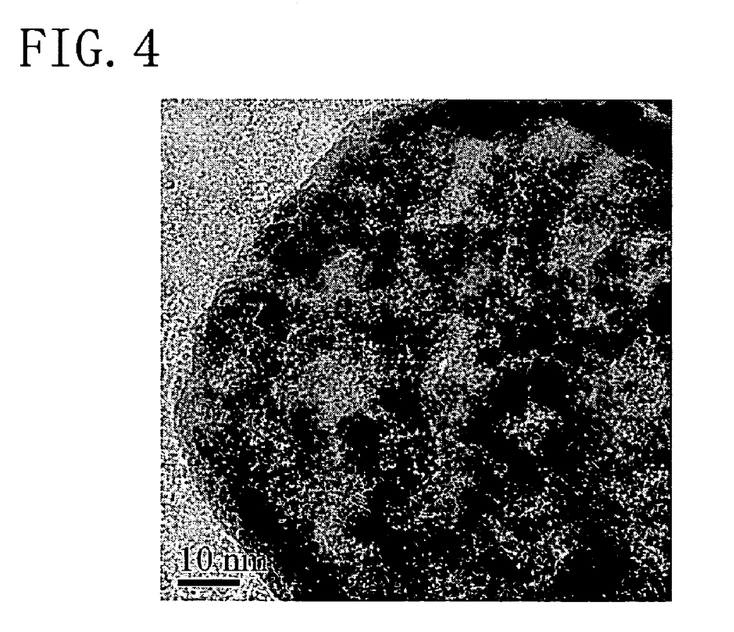
FIG. 4 is another TEM photograph with higher magnification of the same oxygen storage component.

FIGS. 1 and 2 show photographs of the oxygen storage component ($CeO_2$-rich) according to Example 1, taken with transmission electron microscopy (TEM), and FIGS. 3 and 4 show photographs of the oxygen storage component ($ZrO_2$-rich) according to Example 2, taken with TEM. Both the oxygen storage components, as shown in FIGS. 2 and 4, are constituted by hollow secondary particles each formed so that a plurality of 4 to 10 nm-size primary particles cohere into a shell. Fine pores of several nanometer diameter are formed between adjacent primary particles in each secondary particle.

Comparative Example 1

A $CeO_2$-rich oxygen storage component was prepared by coprecipitation. Specifically, predetermined amounts of zirconium oxynitrate and cerium nitrate were mixed with water. The mixed solution was stirred at room temperature for about one hour, heated up to 80° C. and then mixed with 50 mL of 28% aqueous ammonia, thereby obtaining a white-turbid solution. The white-turbid solution was allowed to stand for a day and night to produce a cake. The cake was centrifuged and well rinsed in water. The water-rinsed cake was dried at approximately 150° C. and then calcined by keeping it at 400° C. for five hours and then at 1000° C. for one hour.

The composition of the obtained oxygen storage component was $CeO_2:ZrO_2=75:25$ in mass ratio and was constituted by solid (compact) secondary particles each formed by cohesion of primary particles with a particle size of 10 to several hundred nanometers. Then, the oxygen storage component was used to prepare an exhaust gas purification catalyst in the same manner as in Example 1. The composition of the catalyst was the same as in Example 1.

Comparative Example 2

A $ZrO_2$-rich oxygen storage component was prepared, like Comparative Example 1, by coprecipitation. The composition of the obtained oxygen storage component was $CeO_2:ZrO_2=25:75$ in mass ratio and was constituted by solid (compact) secondary particles each formed by cohesion of primary particles with a particle size of 10 to several hundred nanometers. Then, the oxygen storage component was used to prepare an exhaust gas purification catalyst in the same manner as in Example 1. The composition of the catalyst was the same as in Example 1.

—Light-Off Performance Evaluation—

The catalysts of Examples 1 and 2 and Comparative Examples 1 and 2 were aged by keeping them at 750° C. for 24 hours under atmospheric conditions and then evaluated in terms of light-off performance for NOx conversion using a model gas flow reactor and an exhaust gas analyzer.

Specifically, a model gas of rich A/F ratio was first allowed to flow through each catalyst for 20 minutes under conditions of a gas temperature of 600° C. at the catalyst inlet and a space velocity SV of 120000 $h^{-1}$, then switched to another model gas for evaluation. The switched model gas was raised in temperature at the catalyst inlet from 100° C. to 500° C. at a rate of temperature rise of 30° C./min and measured in terms of changes in NOx conversion efficiency. The model gas for evaluation had an A/F ratio of 14.7±0.9. In other 14.7±0.9. In other words, a mainstream gas was allowed to flow constantly at an A/F ratio of 14.7 and a predetermined amount of gas for changing the A/F ratio was added in pulses of 1 Hz, so that the A/F ratio was forcedly varied with an amplitude of ±0.9. The space velocity of the model gas for evaluation was 60000 $h^{-1}$.

Figure 5:
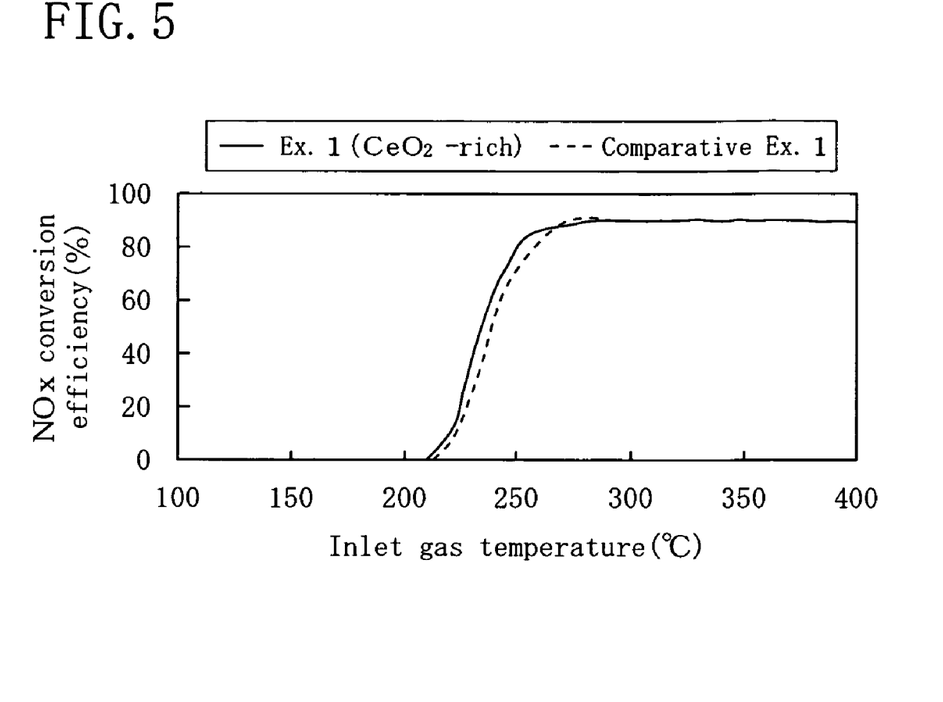
FIG. 5 is a graph showing changes with temperature of the NOx conversion efficiencies of a catalyst of the example ($CeO_2$-rich) of the present invention and a catalyst of a comparative example.
Figure 6:
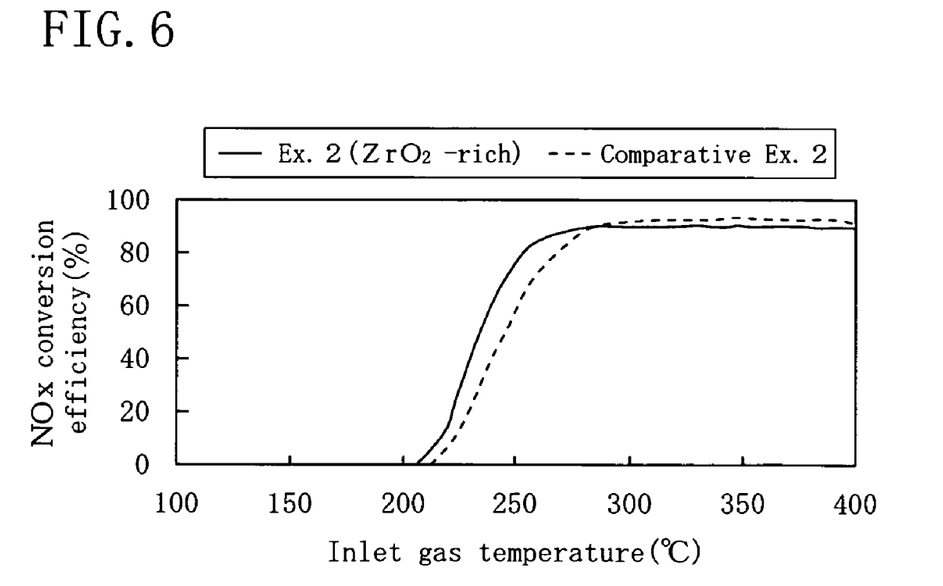
FIG. 6 is a graph showing changes with temperature of the NOx conversion efficiencies of a catalyst of the example ($ZrO_2$-rich) of the present invention and a catalyst of a comparative example.

FIG. 5 shows the results of Example 1 and Comparative Example 1 both of which are $CeO_2$-rich catalysts, and FIG. 6 shown the results of Example 2 and Comparative Example 2 both of which are $ZrO_2$-rich catalysts. Referring to FIG. 5, in the cases of $CeO_2$-rich catalysts, Example 1 has a light-off temperature several degrees lower than Comparative Example 1. Further, referring to FIG. 6, in the cases of $ZrO_2$-rich catalysts, Example 2 has a light-off temperature ten or more degrees lower than Comparative Example 2.

The reason for Examples 1 and 2 having such high light-off performance for NOx conversion can be considered to be due to that since primary particles of these oxygen storage components have a minute average size of less than 10 nm and also form secondary particles of hollow structure, Rh particles are carried on the oxygen storage components with high dispersibility and the oxygen storage components exhibit a relatively high specific surface area even after aged.

INVENTIVE AND COMPARATIVE EXAMPLES OF NOx STORAGE CATALYST

Example A

A $CeO_2$-rich ($CeO_2:ZrO_2=75:25$) oxygen storage component in the form of hollow secondary particles was prepared in the same manner as in Example 1. The primary particles had an average particle size of less than 10 nm.

Next, the oxygen storage component, γ-alumina powder, precious metal solutions (a diamminedinitro platinum nitrate solution and a rhodium nitrate solution), NOx storage components (barium acetate and strontium acetate) and water were put in their respective predetermined amounts in a container and stirred, thereby obtaining a suspension. The suspension was heated up to 100° C. under atmospheric pressure while being stirred, thereby evaporating water and obtaining powder (normal-pressure evaporation to dryness).

The powder obtained by evaporation to dryness was calcined by keeping it at 500° C. for two hours, thereby obtaining catalyst powder in which precious metal particles and NOx storage component particles were carried on the oxygen storage component and the γ-alumina powder both serving as support materials.

Next, the catalyst powder was mixed with a basic Zr binder and water to obtain a slurry. A honeycomb support made of cordierite was immersed in the slurry and then picked up and surplus slurry was removed by air blow. Thereafter, the honeycomb support was calcined by keeping it at 500° C. for two hours, thereby obtaining an exhaust gas purification catalyst. The amounts of oxygen storage component, γ-alumina. Pt, Rh, Ba and Sr carried per L of the honeycomb support were 150 g, 150 g, 3.5 g, 0.3 g, 35 g and 5 g, respectively.

Example B

An exhaust gas purification catalyst was prepared in the same manner as in Example A except that the carrying of precious metals and NOx storage components on the support materials was implemented using vacuum degasification instead of normal-pressure evaporation to dryness.

Specifically, the hollow oxygen storage component, γ-alumina powder, precious metal solutions (a diamminedinitro platinum nitrate solution and a rhodium nitrate solution), NOx storage components (barium acetate and strontium acetate) and water were put in their respective predetermined amounts in a container and stirred, thereby obtaining a suspension. The internal pressure of the container was reduced down to 20 kPa to degas the container while the suspension was stirred and heated up to 70° C. to 80° C., thereby evaporating water (vacuum degasification).

The average particle size of primary particles of the oxygen storage component and the catalyst composition were the same as those in Example A.

Comparative Example

An exhaust gas purification catalyst was obtained in the same manner (normal-pressure evaporation to dryness) as in Example A except that the oxygen storage component is constituted by solid (compact) secondary particles each formed by cohesion of primary particles with an average particle size of less than 10 nm. The composition of the catalyst was the same as in Example A.

—NOx Conversion Performance Evaluation—

The catalysts of Examples A and B and Comparative Example were aged by keeping them at 750° C. for 24 hours under atmospheric conditions and then evaluated in terms of NOx conversion performance using a model gas flow reactor and an exhaust gas analyzer.

Figure 7:
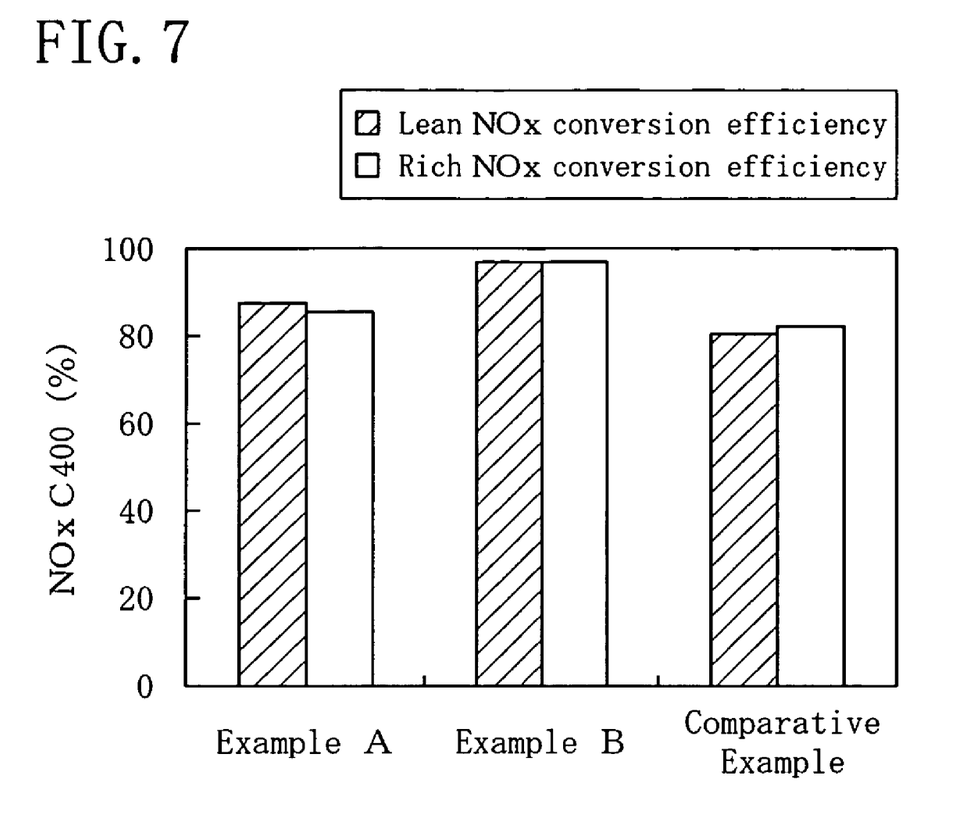
FIG. 7 is a graph showing the NOx conversion efficiencies of catalysts of examples of the present invention and a catalyst of a comparative example under high temperature conditions.

Specifically, a model exhaust gas of lean A/F ratio was first allowed to flow through each catalyst for 60 seconds and then switched to another model exhaust gas of rich A/F ratio and the switched model exhaust gas was allowed to flow through each catalyst for 60 seconds. After this cycle was repeated several times, the catalyst was measured in terms of the NOx conversion efficiency for up to 60 seconds from the point of time when the gas composition was switched from rich A/F to lean A/F (lean NOx conversion efficiency) and the NOx conversion efficiency for up to 60 seconds from the point of time when the gas composition was switched from lean A/F to rich A/F (rich NOx conversion efficiency). The gas temperature at the catalyst inlet was set at 400° C. The evaluation results are shown in FIG. 7.

Examples A and B exhibit higher lean NOx conversion efficiencies and higher rich NOx conversion efficiencies than Comparative Example and, particularly, Example B employing vacuum degasification exhibits high NOx conversion efficiencies. The reason for Examples A and B having high NOx conversion performance can be considered to be due to that since the oxygen storage components are in the form of hollow secondary particles, catalytic precious metals and NOx storage components are carried thereon with high dispersibility and the oxygen storage components exhibit relatively high specific surface areas even after aged. Further, the reason for Example B having higher NOx conversion performance than Example A can be considered to be due to that, by employing vacuum degasification, the fine pores in the oxygen storage component are filled in with the water solutions of catalytic precious metals and NOx storage components concurrently with removal of air from the fine pores, and that the catalytic precious metals and the NOx storage components are thereby carried substantially uniformly over the surface of the oxygen storage component and the insides of the fine pores.

—Specific Surface Area of Oxygen Storage Component—

Figure 8:
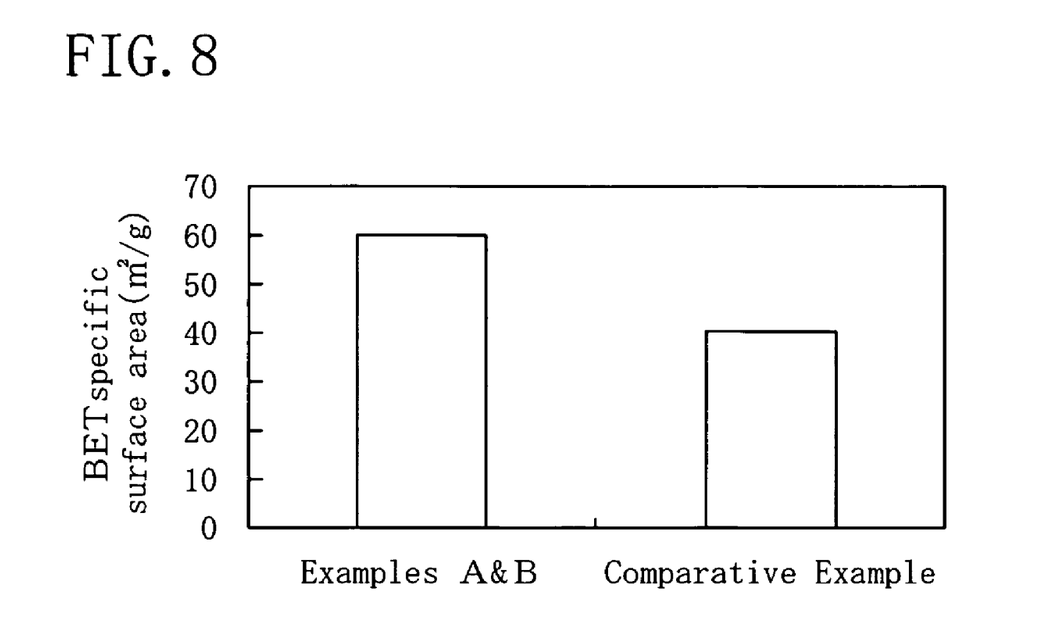
FIG. 8 is a graph showing the BET specific surface areas of oxygen storage components according to the examples of the present invention and an oxygen storage component of the comparative example.

The oxygen storage components of Examples A and B and Comparative Example were measured in terms of BET specific surface area after aged. The aging was implemented by keeping each oxygen storage component at 750° C. for 24 hours under atmospheric conditions. The measurement results are shown in FIG. 8. The oxygen storage components of Examples A and B both exhibited a specific surface area of 60 $m^2/g$, while the oxygen storage component of Comparative Example exhibited a specific surface area of 40 $m^2/g$. FIG. 8 shows that the oxygen storage components of Examples A and B have a large specific surface area even after aged.

What is claimed is:

1. An exhaust gas purification catalyst comprising: an oxygen storage component constituted by a mixed oxide containing cerium and zirconium; and a catalytic metal carried on the oxygen storage component, wherein
    the oxygen storage component is in the form of hollow secondary particles in each of which primary particles of an average particle size of less than 10 nm cohere to form a shell having fine pores.

2. The exhaust gas purification catalyst of claim 1, wherein a NOx storage component is also carried on the oxygen storage component.

3. The exhaust gas purification catalyst of claim 2, wherein at least one of the catalytic metal and the NOx storage component is carried on the surface of the oxygen storage component and the insides of the fine pores.

* * * * *